United States Patent [19]

Liu et al.

[11] Patent Number: 4,737,545

[45] Date of Patent: Apr. 12, 1988

[54] TERNARY POLYCARBONATE BLENDS

[75] Inventors: Ping Y. Liu, Naperville, Ill.; Toshio Ishihara, Evansville, Ind.

[73] Assignee: General Electric Company, Mt. Vernon, Ind.

[21] Appl. No.: 942,319

[22] Filed: Dec. 16, 1986

[51] Int. Cl.$^4$ ............................................. C08L 53/00
[52] U.S. Cl. ..................................... 525/92; 525/146; 525/901
[58] Field of Search ................. 525/92, 146, 901, 148

[56] References Cited

U.S. PATENT DOCUMENTS 4,481,331 11/1984 Liu ....................................... 525/92
4,562,222 12/1985 Liu ....................................... 524/505

*Primary Examiner*—Theodore E. Pertilla
*Attorney, Agent, or Firm*—John Schneller; Martin B. Barancik

[57] ABSTRACT

A composition comprising a. a major amount of an aromatic carbonate polymer;

b. a minor amount of an aromatic carbonate polymer impact modifying composition comprising (i) a linear, sequential, or radial teleblock copolymer resin of a vinyl aromatic compound $(A)_n$ and $(A')_n$ and an olefinic elastomer (B), of the A—B—A'; A—(-B—A—B)$_n$—A; A(—BA)$_n$B; B(A)$_4$B; B(A)$_4$; or B((AB)$_n$B)$_4$ type, wherein n is an integer of from 1 to 10;

(ii) an olefin alkylacrylate wherein the alkyl is one to six carbon atoms and the olefin is two to about five carbon atoms, inclusive, the olefin being from about 55 to 75 weight percent and the alkylacrylate from about 25 to 45 weight percent of the olefin alkylacrylate, said olefin alkylacrylate bringing about increased resistance of the composition comprising a and b to environmental stress crazing and cracking caused by gasoline.

9 Claims, No Drawings

TERNARY POLYCARBONATE BLENDS

FIELD OF THE INVENTION

The invention relates to blends comprising polycarbonate, teleblock copolymer and olefin alkyl acrylate resins having improved physical properties.

BACKGROUND OF THE INVENTION

Aromatic carbonate polymers exhibit excellent properties of toughness, impact resistance, heat resistance, and dimensional stability. However, in certain applications the use of aromatic carbonate polymers is limited because they exhibit environmental stress crazing and cracking. "Environmental stress crazing and cracking" refers to the type of failure which is hastened by the presence of organic solvents such as, for example, gasoline, particularly high octane no-lead gasoline, acetone, heptane and carbon tetrachloride when such solvents are in contact with parts fabricated from aromatic carbonate polymers. The most significant effect is loss of impact strength, and an increase in brittle-type failure. Contact with such organic solvents may occur, for example, when parts fabricated from aromatic carbonate polymers are used under the hood of automobiles or near the gasoline filler ports thereof, or when solvents are used to clean or degrease parts made from aromatic carbonate polymers.

Blends of polycarbonate with either polyolefin or modified polyolefin resins are well known and used in a variety of applications because inter alia of their superior impact strength compared to unblended polycarbonate resins. For example, blends of polycarbonate and a variety of polyolefin resins are described in U.S. Pat. No. 3,431,224 to Kenneth B. Goldblum. As described therein, admixtures of polycarbonate including at least one member of the class consisting of polyethylene, polypropylene, polyisobutylene, a copolymer of ethylene and an alkyl acrylate, a copolymer of ethylene and propylene, a cellulose ester, a polyamide, a polyvinyl acetal, an alkyl cellulose ether, and a polyurethane elastomer exhibit improved solvent resistance and impact strength. While the results with which additives are generally good in thick section, e.g. 6.4 mm, it has been found that there is a tendency for failure to occur with these blends after exposure to high test gasoline.

U.S. Pat. No. 4,260,693 to Ping Y. Liu described ternary polycarbonate compositions having improved impact strength. These ternary compositions comprise a mixture of an aromatic polycarbonate, an olefin-acrylate copolymer, and an acrylate copolymer. These ternary blends exhibit improved low temperature impact strength and improved aged impact strength. The olefin acrylate is ethylene ethyl acrylate 82:18 (ethylene:ethylacrylate) weight percent.

U.S. Pat. No. 4,481,331 to Ping Y. Liu discloses ternary polycarbonate compositions comprising at least one high molecular weight aromatic thermoplastic polycarbonate resin, at least one compound which is a selectively hydrogenated linear, sequential, or radial teleblock copolymer of a vinyl aromatic compound and an olefinic elastomer, and an olefin acrylate copolymer. These ternary blends exhibit improved resistance to environmental stress crazing and cracking. The same ethylene ethylacrylate is used as in U.S. Pat. No. 4,260,693. The general olefin content of the olefin acrylate is described as 70–90 weight percent.

SUMMARY OF THE INVENTION

According to the present invention, there is disclosed a composition comprising
 a. a major amount of a carbonate polymer;
 b. a minor amount of an aromatic carbonate polymer impact modifying composition comprising
  (i) a linear, sequential, or radial teleblock copolymer resin of a vinyl aromatic compound $(A)_n$ and $(A')_n$ and an olefinic elastomer (B), of the A—B—A'; A—(-B—A—B)$_n$—A; A(—BA)$_n$B; (A)$_4$B; B(A)$_4$; or B((AB)$_n$B)$_4$ type, wherein n is an integer of from 1 to 10;
  (ii) an olefin alkylacrylate wherein the alkyl is one to five carbon atoms and olefin of two to five carbon atoms, inclusive, the olefin being from about 55 to 75 weight percent and the alkylacrylate from about 25 to 45 weight percent of the olefin alkylacrylate, said olefin alkylacrylate bringing about increased resistance of the composition comprising a and b to environmental stress crazing and cracking caused by gasoline.

DETAILED DESCRIPTION OF THE INVENTION

The polycarbonate resin used in the binary blends of the present invention is an aromatic carbonate polymer which may be prepared by reacting a dihydric phenol with a carbonate precursor such as phosgene, a haloformate, or a carbonate ester. Generally speaking, such aromatic carbonate polymers may be typified as possessing recurring structural units of the formula:

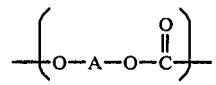

wherein A is a divalent aromatic radical of the dihydric phenol employed in the polymer producing reaction. Preferably, the aromatic carbonate polymers used in the binary blends of the present invention have an intrinsic viscosity (as measured in methylene chloride in deciliters per gram at 25° C.) ranging from about 0.30 to about 1.00. The dihydric phenols which may be employed to produce such aromatic carbonate polymers are mononuclear or polynuclear aromatic compounds, containing as functional groups two hydroxy radicals, each of which is attached to a carbon atom of an aromatic nucleus. Typical dihydric phenols are:
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxyphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;

4,4'-dihydroxy-2,5-dimethoxydiphenyl ether; and the like.

Other dihydric phenols which are also suitable for use in the preparation of the polycarbonates used in the present invention are disclosed in U.S. Pat. Nos. 2,999,835; 3,038,365; 3,334,154; and 4,131,575. The preferred dihydric phenol is 2,2-bis(4-hydroxyphenyl) propane (bisphenol-A).

These aromatic polycarbonates can be manufactured by known processes, for example and as mentioned above, by reactng a dihydric phenol with a carbonate precursor, such as phosgene, in accordance with the methods set forth in the above-mentioned parent publications, and in U.S. Pat. Nos. 4,018,750 and 4,123,436, or by other processes known to those skilled in the art.

Included within the present definition of polycarbonates which may be used to form the binary blends of the present invention are also the copolyestercarbonates. The copolyestercarbonates are polymers derived from a dihydric phenol, a carbonate precursor, and an ester precursor such as a difunctional carboxylic acid or an ester forming reactive derivative thereof. These copolyestercarbonate resins as well as methods for their preparation, are disclosed inter alia, for example in U.S. Pat. Nos. 3,169,121; 4,465,820 and 4,506,065, which are incorporated herein by reference.

As used in the present application, a teleblock copolymer is a selectively hydrogenated linear, sequential or radial copolymer comprising vinyl aromatic compounds (A) and (A') independently selected from styrene, o-methylstyrene, p-methylstyrene, vinyl toluene, vinyl xylene, or vinyl naphthylene, and an olefinic elastomer (B) of the type:

A—B—A'

A—(B—A—B)$_n$—A'

A(BA)$_n$B (A)$_4$B

B(A)$_4$

B((AB)$_n$B)$_4$ wherein n is an integer having a value from 1 to 10. For example, the selectively hydrogenated end block copolymers (A) and (A') may each be a styrene block having a weight average molecular weight of from about 2,000 to about 60,000. The selectively hydrogenated center block copolymer (B) may be a diolefin block selected from butadiene, isoprene, 1,3-pentadiene, and 2,3-dimethylbutadiene, having a weight average molecular weight from about 20,000 to about 450,000.

Selectively hydrogenated linear block copolymers are described in U.S. Pat. No. 3,333,024 to Haefel, et al, which is incorporated herein by reference.

The selectively hydrogenated linear, sequential or radial copolymers which comprise the teleblock copolymer component of the ternary compositions of the present invention are well known in the art and are generally commercially available or may be prepared by known methods, as mentioned below. Hydrogenated block copolymers such as Kraton G-1650 and Kraton G-1651 from Shell Chemical Company, Polymers Division have been found useful in the present invention. Also useful are the Solprenes as described in U.S. Pat. Nos. 3,753,936 to Marrs and 3,281,383 by Zelinski, both of which are incorporated herein by reference. As used herein, the term "selective hydrogenation" is used to mean polymers in which the end blocks (A) and (A') have been left aromatic, i.e. not hydrogenated.

As mentioned above, each end block (A) and (A') has a weight average molecular weight of about 2,000 to about 60,000 and center block (B), e.g. a hydrogenated polybutadiene block, has a weight average molecular block of about 20,000 to about 450,000. Preferably, the end blocks each have a weight average molecular weight of about 7,000 to about 35,000, and the center block (B) preferably has a weight average molecular weight between about 30,000 and 150,000. The end blocks (A) and (A') will preferably comprise from about 20% to about 45% by weight, and more preferably from about 25% to about 40% by weight of the total block copolymer.

The selectively hydrogenated teleblock copolymer will have the average unsaturation reduced to less than 20% of the original value. It is preferred to have the unsaturation of the center block (B) reduced to 10% or less, preferably 5% or less, of its original value. After hydrogenation, center blocks (B) derived from isoprene will have the ethylene butylene structure.

The teleblock copolymers which comprise the second component of the compositions of the present invention are formed by techniques well known to those skilled in the art. Hydrogenation may be conducted using a variety of hydrogenation catalysts such as Raney nickel, nickel on kieselguhr, copper chromate, molybdenum sulfide, finely divided platinum, etc. Hydrogenation may be conducted at any desired temperature or pressure, e.g. from atmospheric to about 210 kgf/cm$^2$. The preferred pressure is usually between about 100 and 70 kgf/cm$^2$ and the preferred temperature is usually from about 75° to about 315° C. for times between about 0.1 and 24 hours, preferably from about 0.2 to about 8 hours.

Suitable olefin alkyl acrylate copolymers can be prepared by methods well known to those skilled in the art, or can be obtained commercially. The olefin is selected from C$_2$ to C$_5$ olefins, and is preferably selected from the group consisting of ethylene, propylene, and isobutylene and is most preferably ethylene. The alkyl acrylate is selected from C$_1$ to C$_5$ acrylates, and is preferably selected from the group consisting of ethyl acrylate, n-butyl acrylate, 1,3-butylene diacrylate, isobutyl acrylate, methyl acrylate, and 1,4-butanediol diacrylate. Preferably the alkyl is ethyl. Most preferably, the olefin alkyl acrylate copolymer is an ethylene ethyl acrylate. Surprisingly, it has been found that lowering the olefin content of the olefin acrylate increases the resistance to environmental stress cracking caused by gasoline. The olefin is from about 55 to 75 weight percent of the olefin alkyl acrylate and the alkyl acrylate is about 25 to 45 weight percent. For example, when the olefin alkyl acrylate is ethylene ethylacrylate the ethylene may be present in an amount from about 57 to 68 weight percent and the ethylacrylate may be present from about 32 to 43 weight percent. Nippon Union Carbide's MB 870 and MB 910 ethylene ethyl acrylate copolymers are suitable use in the present invention. MB 870 contains an ethylene/ethyl acrylate weight ratio of 59/41, and MB 910 contains an ethylene/ethyl acrylate weight ratio of 72/28. The preparation of copolymers of ethylene with an alkyl ester of acrylic acid is disclosed in U.S. Pat. No. 2,953,551, incorporated herein by reference.

The aromatic carbonate polymer is present in major quantities, generally from about 54 to 96 weight percent of a. plus b., preferably 70 to 94 weight percent, more preferably 76 to 92 weight percent. Component b.(i) and b.(ii) each generally comprise from about 2 to about 23 weight of a. and b. together, preferably each comprises from about 3 to 15 weight percent and more preferably 4 to 12 weight percent.

Within the broad composition ranges specified above, many resin mixtures may be prepared in accordance with the subject invention which unexpectedly improves the impact resistance of the blended mixture to environmental stress crazing and cracking, resulting in improved physical properties.

The compositions of the present invention may be prepared by dry blending the aromatic carbonate polymer resin component, and the teleblock copolymer and olefin alkyl acrylate component until complete dispersion of all of the ingredients is obtained. The resin mixture is then extruded and chopped to form pellets and thereafter molded in accordance with conventional methods. The blends of the present invention may be defined as mixtures of a polycarbonate resin, a teleblock copolymer and an olefin alkyl acrylate.

The resistance to impact failure of the carbonate polymer resin mixtures prepared in accordance with the subject invention was determined with the Notched Izod Impact Test, ASTM D256 on molded test specimens in the form of bars of two sizes:

63.5 mm × 12.7 mm × 3.2 mm 63.5 mm × 12.7 mm × 6.4 mm the latter dimension being the specimen thickness. The test specimens were mounted in accordance with ASTM D256 procedures and were tested at room temperature. Izod impact strengths were determined for all specimens according to ASTM D256 procedures on notched specimens and are reported in kgf.cm/cm of notch.

DESCRIPTION OF THE PREFERRED EMBODIMENTS

In order that those skilled in the art may better understand how the present invention may be practiced, the following Examples are given by way of illustration and not by way of limitation. All parts and percentages are by weight unless otherwise noted.

In Table I, the blend of resins contained LEXAN® 145 polycarbonate resin (PC) with an intrinsic viscosity of 0.46 to 0.49, a selectively hydrogenated styrene-butadiene-styrene teleblock copolymer (Shell Chemical Kraton G 1651) denoted (BC), and a copolymer of ethylene and ethyl acrylate (EEA) as indicated in the Table.

The blends indicated in the table were tested for resistance to environmental stress. Specimens were mounted on an ASTM stress jig (1% strain/240 kgf/cm$^2$) and soaked for two hours at room temperature in AMOCO® premium unleaded gasoline. The specimens were removed from the jig, the gasoline allowed to evaporate at room temperature for 24 hours, and then subjected to the Notched Izod test, ASTM D256. The results are set forth in Table I.

TABLE I

| EXAMPLE | WT. % | | | (E/EA) WT. % | NOTCHED IZOD 3.2 mm | | NOTCHED IZOD 6.4 mm | |
| | PC | BC | EEA | | BEFORE SOAKING | AFTER SOAKING | BEFORE SOAKING | AFTER SOAKING |
| --- | --- | --- | --- | --- | --- | --- | --- | --- |
| Control | 85 | 10 | 5 | 82/18[a] | 74.6 | 27.2 | 59.9 | 37.6 |
| 1 | 85 | 10 | 5 | 72/28[b] | 72.9 | 72.9 | 55.5 | 52.3 |
| 2 | 85 | 10 | 5 | 59/41[c] | 74.0 | 74.0 | 59.9 | 57.2 |

[a]Union Carbide DPD 6169
[b]MB910
[c]MB870

What is claimed is:

1. A composition comprising
   a. a major amount of an aromatic carbonate polymer;
   b. a minor amount of an aromatic carbonate polymer impact modifying composition comprising
   (i) a linear, sequential, or radial teleblock copolymer resin of a vinyl aromatic compound (A)$_n$ and (A')$_n$ and an olefinic elastomer (B), of the A—B—A'; A—(B—A—B)$_n$—A; A(—BA)$_n$B;(A)$_4$B; B(A)$_4$; or B((AB)$_n$B)$_4$ type, wherein n is an integer of from 1 to 10; and
   (ii) an ethylene ethylacrylate the ethylene being from 57 to 68 weight percent and the ethylacrylate from 32 to 43 weight percent of the ethylene ethylacrylate, said ethylene ethylacrylate bringing about increased resistance to environmental stress crazing and cracking caused by gasoline.

2. The composition in accordance with claim 1 wherein the aromatic carbonate polymer is polycarbonate.

3. The composition in accordance with claim 2 wherein copolymer resin (b) (i) is a selectively hydrogenated block copolymer and (A) and (A') are selected from styrene, alpaha-methylstyrene, p-methyl styrene, vinyl toluene, vinyl xylene and vinyl naphthylene and (B) is selected from butadiene, isoprene, 1,3-pentadiene and 2,3-dimethylbutadiene.

4. The composition in accordance with claim 3 wherein in said selectively hydrogenated block copolymer resin (b)(i), (A) is a styrene block, (B) is a diolefin block, and (A') is a styrene block.

5. The composition in accordance with claim 4 wherein in component (b)(i) terminal blocks (A) and (A') each have weight average molecular weights of about 2,000 to 60,000 respectively, and center block (B) has a weight average molecular weight of from about 20,000 to 450,000.

6. The composition in accordance with claim 2 wherein a. comprises from about 54 to 96 weight percent of a. and b. together and b.(i) and b.(ii) each comprises from about 2 to 23 weight percent of a. and b. together.

7. The composition in accordance with claim 6 wherein a. comprises about 70 to 94 weight percent and b.(i) and b.(ii) each comprises about 3 to 15 weight percent.

8. The composition in accordance with claim 7 wherein a. comprises about 76 to 92 weight percent and b.(i) and b.(ii) each comprises about 4 to 12 weight percent.

9. The composite in accordance with claim 4 wherein the aromatic polycarbonate is bisphenol-A polycarbonate.